Figure 1:
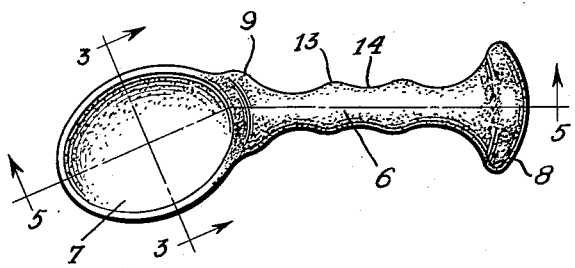

Nov. 27, 1951 R. S. CLAFLIN 2,576,388
CHILD'S SPOON
Filed March 15, 1947

Inventor:
Roland S. Claflin
By: Fred Wells.
Attorney

Patented Nov. 27, 1951

2,576,388

UNITED STATES PATENT OFFICE 2,576,388

CHILD'S SPOON

Roland S. Claflin, Park Ridge, Ill.

Application March 15, 1947, Serial No. 734,962

1 Claim. (Cl. 30—327)

My invention relates to improvements in a child's spoon. The principal purpose of my invention is to provide an improved spoon that is particularly adapted to aid a child just beginning to feed itself in grasping, holding and manipulating the spoon. Children at the age when they begin to feed themselves have very little control of their fingers individually and therefore have considerable difficulty in grasping and properly holding a small article such as a spoon. Moreover, the spoons as now made for babies, so far as I am aware, follow the conventional spoon pattern with some variations such as a looped handle. Such spoons do not hold the food very well and are easily emptied by a slight tipping. According to my invention I provide a spoon with certain handle and bowl features, so related that the spoon is easily grasped by the tiny hands of the babies and when so grasped is held in such position as to facilitate carrying the food from a dish to the child's mouth without emptying the contents before they reach the mouth. It is a purpose of my invention therefore to provide an improved child's spoon wherein the handle is always positioned above the table surface sufficiently to be grasped, and wherein the handle part is set off at both ends by enlargements to direct the hand of the child.

It is also a purpose of my invention to provide a spoon with the bowl position set angularly with respect to the handle so that it may be directed to the mouth with less twisting or bending of the wrist.

A further purpose of my invention is to provide the spoon with an improved bowl portion cooperating with the handle to better hold the contents of the bowl while they are being carried to the mouth.

The nature and advantages of my invention will appear more fully from the following description and the accompanying drawings wherein a preferred form of the invention is shown. It should be understood, however, that the drawings and description are illustrative only and should not be taken as limiting the invention, except insofar as it is limited by the claim.

Figure 5:
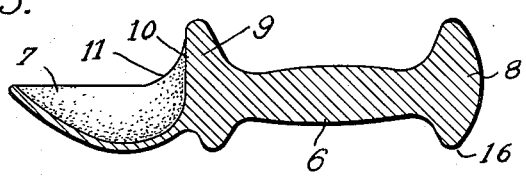

In the drawings:

Figure 1 is a plan view of a spoon embodying invention;

ure 2 is a side view of the spoon;

e 3 is a sectional view taken on the line igure 1;

is a sectional view taken on the line re 2; and,

Figure 5 is a sectional view taken on the line 5—5 of Figure 1.

Referring now to the drawings; my invention is illustrated as applied to a spoon wherein the handle portion is indicated at 6, the bowl at 7 and enlargements are shown at 8 and 9 at the opposite ends of the handle portion 6. The enlargement 8 has a flat bottom edge 16. The spoon may be made of any suitable material. Preferably I make it of a suitable plastic composition that provides a smooth non-porous, easily cleaned surface and that can be colored a bright attractive color. The handle portion 6 is held away from a table or other surface on which the spoon may rest by the enlargements 8 and 9.

Figure 2:
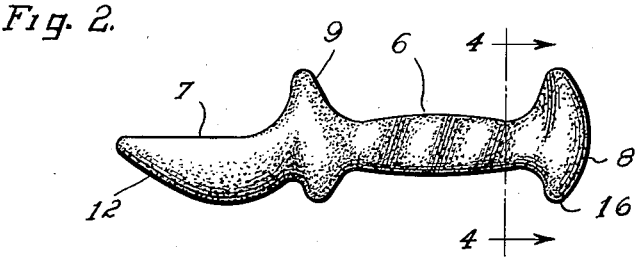
Figure 3:
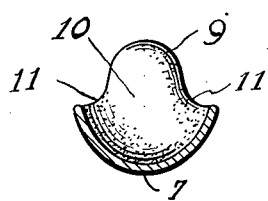
Figure 4:
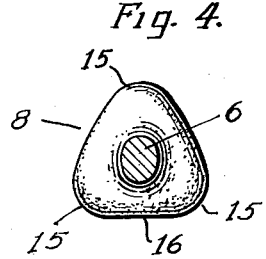

The bowl 7 is set with its long axis at an acute angle with respect to the axis of the handle. The angle preferably should be in the neighborhood of 20 degrees to 25 degrees. The bowl is deeper than usual in spoons. The main characteristic of the bowl however lies in the upstanding back wall 10, which is part of the enlargement 9, and the upwardly curved side walls 11 adjacent to the back wall. These walls form an extension of the bowl to hold the contents better as the tiny untrained hand attempts to bring the filled spoon to the mouth. The forward lower line of the bowl, indicated at 12 in Figure 2, is quite straight to aid in filling the spoon.

Between the enlargements 8 and 9, the handle 6 has ribs 13 and valleys 14 extending up and down on opposite sides thereof to give enough uneven contour to aid in gripping. I have found also that it is best to have the handle deeper than it is wide, with its greatest depth about midway of the handle.

The end portion 8 preferably is made roughly triangular in shape with rounded corners 15. The enlargement 9, the bottom of the bowl 7 and the bottom edge 16 of the end 8 are in the same plane. These portions provide supports to establish a stable resting position of the spoon when it is resting on a table surface.

It is believed to be evident from the foregoing description, that I have provided an improved spoon for children learning to feed themselves.

Having thus described my invention, I claim:

A child's feeding implement having a food retaining bowl shaped portion and an elongated straight handle portion with enlargements at both ends of the handle portion adapted to hold the handle portion raised from a surface on which the enlargements rest, the enlargement most remote from the bowl-shaped portion being flat bottomed, and the food retaining portion being disposed at an obtuse angle with respect to the handle in the horizontal plane when the implement is in a position of rest on a horizontal surface.

ROLAND S. CLAFLIN.

REFERENCES CITED

The following references are of record in the file of this patent:

UNITED STATES PATENTS

| Number | Name | Date |
|---|---|---|
| D. 112,616 | Pratt et al. | Dec. 20, 1938 |
| 1,625,003 | Walker | Apr. 19, 1927 |
| 2,028,519 | Peterkin et al. | Jan. 21, 1936 |
| 2,295,847 | Hume | Sept. 15, 1942 |
| 2,421,339 | Leger | May 27, 1947 |

FOREIGN PATENTS

| Number | Country | Date |
|---|---|---|
| 615,568 | France | Oct. 12, 1926 |